(12) United States Patent
Hussa

(10) Patent No.: US 11,909,464 B2
(45) Date of Patent: Feb. 20, 2024

(54) TIME CODING FOR DATA COMMUNICATION

(71) Applicant: NOKIA TECHNOLOGIES OY, Espoo (FI)

(72) Inventor: Timo Tero Joonas Hussa, Haapavesi (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/639,107

(22) PCT Filed: Aug. 27, 2020

(86) PCT No.: PCT/EP2020/073936
§ 371 (c)(1),
(2) Date: Feb. 28, 2022

(87) PCT Pub. No.: WO2021/052732
PCT Pub. Date: Mar. 25, 2021

(65) Prior Publication Data
US 2022/0337291 A1    Oct. 20, 2022

(30) Foreign Application Priority Data

Sep. 18, 2019 (FI) .................................... 20195783

(51) Int. Cl.
*H04B 7/0408* (2017.01)
*H04B 7/165* (2006.01)
*H04L 1/06* (2006.01)

(52) U.S. Cl.
CPC .......... *H04B 7/0408* (2013.01); *H04B 7/165* (2013.01); *H04L 1/0625* (2013.01)

(58) Field of Classification Search
None
See application file for complete search history.

(56) References Cited

U.S. PATENT DOCUMENTS 8,190,938 B2    5/2012    Nurminen et al.
9,462,549 B2    10/2016   Alon et al.
(Continued)

FOREIGN PATENT DOCUMENTS

EP    2882163       6/2015
EP    3407276 A2    11/2018
(Continued)

OTHER PUBLICATIONS

First Examination Report for Indian Application No. 202247021442 dated Sep. 6, 2022, 6 pages.
(Continued)

*Primary Examiner* — Minh Trang T Nguyen
(74) *Attorney, Agent, or Firm* — ALSTON & BIRD LLP

(57) ABSTRACT

Various example embodiments provide a system for transmission of low power signals based on using transmission time as one coding parameter. A code table may be used at a transmitter and receiver to map different data to different transmission times and/or other parameters. Advantageously, large amount of information may be transmitted with short and power efficient signals, for example to report status of a sensor every now and then. A receiver may use the same code table to decode the signals. Apparatuses, methods, and computer programs are disclosed.

20 Claims, 9 Drawing Sheets

(56) References Cited

U.S. PATENT DOCUMENTS

| | | |
|---|---|---|
| 2006/0049960 A1 | 3/2006 | Hudson |
| 2010/0091758 A1 | 4/2010 | Goteti et al. |
| 2015/0033100 A1 | 1/2015 | Kim et al. |
| 2018/0181908 A1 | 6/2018 | Jones et al. |
| 2019/0089787 A1 | 3/2019 | Yi et al. |
| 2020/0169272 A1* | 5/2020 | Hui .................. H03M 13/6356 |

FOREIGN PATENT DOCUMENTS

| | | |
|---|---|---|
| WO | WO 2011/001211 A1 | 6/2011 |
| WO | WO 2017/194158 A1 | 11/2017 |
| WO | WO 2019/052911 A1 | 3/2019 |
| WO | WO 2019/088884 A1 | 5/2019 |

OTHER PUBLICATIONS

"5G/NR—SS Block", Retrieved on May 19, 2022, Retrieved via the Wayback Machine: < URL: https://web.archive.org/web/20190828010704/https://www.sharetechnote.com/html/5G/5G_SS_Block.html>, (Aug. 28, 2019), 10 pages.

"Introducing AgilePQ DCM (Digital Conversion Module)", National Renewable Energy Laboratory, Retrieved via the Internet: <URL: https://www.nrel.gov/esif/assets/pdfs/20170106-nrel_sges_webinar_presentation_agilepq.pdf>., (Jan. 9, 2017), 19 pages.

"Wikipedia—IEEE 802.11", Retrieved on Feb. 3, 2022, Webpage available at :<URL:https://en.wikipedia.org/wiki/IEEE_802.11>, (Jan. 25, 2022), 15 pages.

"Wikipedia—Pairing (computing)", Retrieved on Feb. 7, 2022, Webpage available at : <URL:https://en.wikipedia.org/wiki/Pairing_(computing)>, (Oct. 16, 2020), 1 page.

European Application No. 18173150.6, "Device Security", filed on May 18, 2018, 43 pages.

Gotsis et al., "M2M Scheduling over LTE: Challenges and New Perspectives", IEEE Vehicular Technology Magazine, vol. 7, No. 3, (Sep. 2012), pp. 34-39.

International Search Report and Written Opinion for Patent Cooperation Treaty Application No. PCT/EP2020/073936 dated Nov. 17, 2020, 13 pages.

Office Action for Finland Application No. 20195783 dated Jan. 16, 2020, 8 pages.

Pizurica, V., "Why Time Dimension is Vital in IoT and How a Rules Engine Can Reduce Complexity", Dzone IoT Zone, Retrieved from the Internet: <https://dzone.com/articles/why-the-time-dimension-is-vital-in-iot-application>, (May 24, 2019), 2 pages.

Said et al., "Optimized Mechanism for Minimizing Data Overhead in IoT Environments: Design, Simulation and Performance Evaluation", International Journal of Applied Engineering Research ISSN 0973-4562 vol. 12, No. 23, (2017), 14 pages.

Sharma et al., "Towards Massive Machine Type Communications in Ultra-Dense Cellular IoT Networks: Current Issues and Machine Learning-Assisted Solutions", IEEE Communications Surveys & Tutorials, (Aug. 8, 2018), 37 pages.

Tan et al., "Covert Timing Channels for IoT Over Mobile Networks", IEEE Wireless Communications, vol. 25, Issue 6, (Dec. 2018), 7 pages.

Office Action for European Application No. 20765228.0 dated Aug. 11, 2023, 7 pages.

* cited by examiner

| Bit(s) | Time instant | Logical operation | Source ID | Logical operation | Reception direction | Information | Corresponding bit sequence (HEX) | Meaning of the bit sequence |
|---|---|---|---|---|---|---|---|---|
| 0 | 12:00:00 | | | | | Request for maintenance within a day | | |
| 1 | 12:00:00 | | | | | Request for maintenance ASAP | | |
| 1 | 12:02:00 | | | | | Request for predetermined information | | |
| 1 | 12:03:00 | | | | | Request for updated code table | | |
| 1 | 16:06:00 | | | | | Measured temperature is below a predetermined threshold | | |
| 1 | 7:00:00 | | | | | Request to start factory with parameter set XYZ (day shift) | | |
| 1 | 16:00:00 | | | | | Request to start factory with parameter set ABC (evening shift) | | |
| 1 | 22:00:00 | | | | | Request to start factory with parameter set DEF (night shift) | | |

FIG. 5

| Bit(s) | Time instant | Logical operation | Source ID | Reception direction | Information | Corresponding bit sequence (HEX) | Meaning of the bit sequence |
|---|---|---|---|---|---|---|---|
| 0 | 12:10:00 | | | | Status from 8 door sensors | 00 | 1 = open<br>0 = closed |
| 0 | 12:10:01 | | | | | 01 | |
| 0 | 12:10:02 | | | | | 02 | |
| ... | ... | | | | | ... | |
| 0 | 12:14:15 | | | | | FF | |
| 1 | 12:10:00 | | | | Alarm from 8 sensors | 00 | 1 = alarm<br>0 = no alarm |
| 1 | 12:10:01 | | | | | 01 | |
| 1 | 12:10:02 | | | | | 02 | |
| ... | ... | | | | | ... | |
| 1 | 12:14:15 | | | | | FF | |
| 1 | 16:05:00 | | | | Request for switching any of 4 lamps on/off | 0 | 1 = lamp on<br>0 = lamp off |
| 1 | 16:05:01 | | | | | 1 | |
| 1 | 16:05:02 | | | | | 2 | |
| ... | ... | | | | | ... | |
| 1 | 16:05:15 | | | | | F | |

FIG. 7

| Bit(s) | Time instant | Logical operation | Source ID | Reception direction | Information | Corresponding bit sequence (HEX) | Meaning of the bit sequence |
|---|---|---|---|---|---|---|---|
| 1 | N/A | | | Beam 1 | Request for Operation 1 | | |
| 1 | N/A | | | Beam 2 | Request for Operation 2 | | |
| 1 | 12:00:00 | | | Beam 1 | Request for Operation 3 | | |
| 1 | 12:00:00 | | | Beam 2 | Request for Operation 4 | | |
| 1 | 12:01:00 | AND | IoT 1 | Beam 1 | Request for Operation 5 | | |
| 1 | 12:01:00 | AND | IoT 2 | Beam 2 | Request for Operation 6 | | |
| 1 | 12:10:00 | AND | IoT 3 | Angle 1 | Request for Operation 7 | | |
| 1 | 12:10:00 | AND | IoT 3 | Angle 2 | Request for Operation 8 | | |

FIG. 8

TIME CODING FOR DATA COMMUNICATION

CROSS-REFERENCE TO RELATED APPLICATIONS

This application is a national phase entry of International Application No. PCT/EP2020/073936, filed Aug. 27, 2020, which claims priority to Finnish Application No. 20195783, filed Sep. 18, 2019, the entire contents of which are incorporated herein by reference.

TECHNICAL FIELD

Various example embodiments generally relate to the field of data communications. In particular, some example embodiments relate to transmission or reception of data.

BACKGROUND

In various data communication applications is desired to minimize energy consumption to enable devices to operate for a long time without access to an external energy source. For example, internet-of-things (IoT) devices may be configured to operate independently, for example to gather information and to transmit the information periodically to another device such as a server. In some applications the periods between transmissions may be long. For example, an IoT device may be configured to deliver the gathered information once in an hour, day, week, or even a year.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide a method for power efficient data transmission. This benefits is achieved by the features of the independent claims. Further implementation forms are provided in the dependent claims, the description, and the drawings.

According to a first aspect, an apparatus comprises means for receiving data for encoding; means for determining a transmission time for a signal based on the data; and means for transmitting the signal at the determined transmission time, wherein the data is encoded into the transmission time, or means for determining not to transmit the signal at the determined transmission time.

According to a second aspect, a method comprises receiving data for encoding; determining a transmission time for a signal based on the data; and transmitting the signal at the determined transmission time, wherein the data is encoded into the transmission time, or determining not to transmit the signal at the determined transmission time.

According to a third aspect, a computer program is configured, when executed by an apparatus, to cause the apparatus at least to: receive data for encoding; determine a transmission time for a signal based on the data; and transmit the signal at the determined transmission time, wherein the data is encoded into the transmission time, or determine not to transmit the signal at the determined transmission time.

According to a fourth aspect, an apparatus comprises at least one processor and at least one memory including computer program code, the at least one memory and the computer code configured to, with the at least one processor, cause the apparatus at least to: receive data for encoding; determine a transmission time for a signal based on the data; and transmit the signal at the determined transmission time, wherein the data is encoded into the transmission time, or determine not to transmit the signal at the determined transmission time.

According to a fifth aspect, an apparatus comprises means for receiving a signal; means for determining a reception time for the signal; and means for decoding data based on the reception time.

According to a sixth aspect, a method comprises receiving a signal; determining a reception time for the signal; and decoding data based on the reception time.

According to a seventh aspect, a computer program is configured, when executed by an apparatus, to cause the apparatus at least to: receive a signal; determine a reception time for the signal; and decode data based on the reception time.

According to an eighth aspect, an apparatus comprises at least one processor and at least one memory including computer program code, the at least one memory and the computer code configured to, with the at least one processor, cause the apparatus at least to: receive a signal; determine a reception time for the signal; and decode data based on the reception time.

According to a ninth aspect, an apparatus, comprising means for receiving data for transmission, means for determining a transmission time for a signal based on the data, means for transmitting the signal at the determined transmission time, wherein the data is encoded into the transmission time.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 5 illustrates an example of a code table, wherein information is encoded into transmission time, according to an example embodiment;

FIG. 7 illustrates an example of a code table, wherein information encoded into transmission time corresponds to a bit sequence, according to an example embodiment;

FIG. 8 illustrates an example of a code table, wherein information is encoded into selection of a beam, a source identifier, transmission time, and/or arrival angle, according to an example embodiment;

Like references are used to designate like parts in the accompanying drawings.

DETAILED DESCRIPTION

Figure 1:
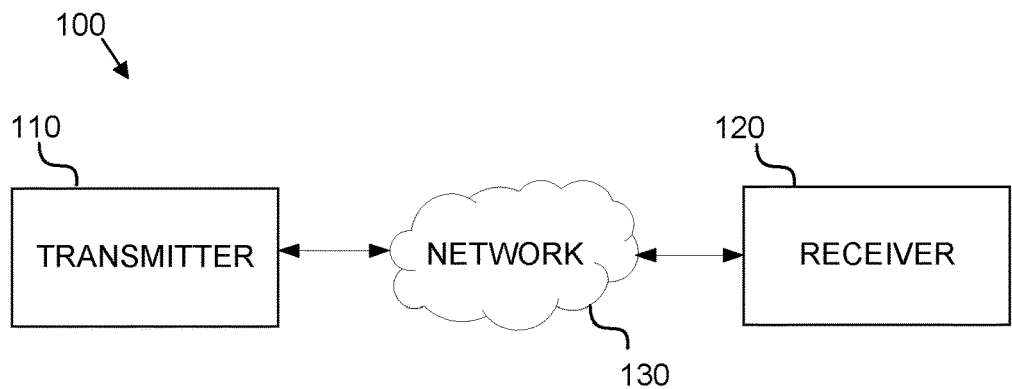
FIG. 1 illustrates an example of data communication between a transmitter and a receiver, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In one example a transmitter transmits signal at the time wherein a time instant corresponds to data content. The data is known both in transmitter and receiver. The signaling time instant may be derived from data in transmitter. The data may be derived from signaling time instant in receiver. The signaling time comprises at least one of transmission time instant or reception time instant, or time window covering transmission time instant and reception time instant. Even though data is the same in the transmitter and receiver, it is not known whether the data is measured or generated, or reached by the IoT device, before planned action has been occurred at the specific transmission time.

In one example unique signaling (transmission) time corresponds to unique data content. Unique data content may force to use unique signaling time. Unique signaling time may be found in predetermined quantity data which provides linkage between data content and transmission time.

The data may comprise quantity, variable, magnitude, physical quantity, for example or quality, state, property, kidney, grade, brand, texture, rate, audio signal, video signal, threshold, prediction, geographical coordination, for example.

The transmitter may receive a data, for example from a sensor. The data is compared with a predetermined data associated with or stored in the transmitter. If the data is detected in predetermined data, instructions for transmission, or not, or transmission time instant is followed. Indication is sent to receiver at the corresponding time instant or transmission is denied according to instructions. The indication may comprise source and time of transmission in a signal. The data may not be sent. Instead encoded data as indication is sent. This saves for example natural resources such as radio resources when the transmission of data amount can be decreased. The data amount can be indicated by sending an indication to data amount i.e. no need to send high amount of data at all. It is evident that also battery consumption is decreased when transmission/receiving time is short.

Receiver comprises the predetermined data which corresponds with the one in the transmitter. Indication is received in a signal by receiver as sent from transmitter according to planned instructions in transmitter and receiver. The time of transmission in the indication is compared with predetermined data associated with or stored in the receiver. Receiver is configured responsive to the indication to obtain the data from the predetermined data. In further embodiment receiver may have a function to obtain a predetermined data in response checking the predetermined data at the specific time. Transmission time corresponds just particular data which is known both transmitter and receiver side in advance.

When IoT device gets data the data may be analyzed. Either data is encoded to transmission time specific for that data, or data may be checked if that data can be found in the predetermined data in code table. When transmission time corresponds to the data, signal is encoded to be transmitted at the transmission time. The transmission time is known by both transmitter and receiver side in advance. Data is not transmitted but signal (encoded data) transmission at time is pointer to predetermined data in the receiver.

When the data is not yet present as predetermined data in code table, the transmitter may establish new data entry with available (free/unused) signaling time to the code table. The transmitter teaches the receiver by sending new entry (data+ signaling time) to the receiver which stores new entry to its memory/database. After that signaling time can be used between transmitter and receiver to indicate/pointer to new data. Therefore the teaching phase uses more radio resources when introducing new entry in the code table between transmitter and receiver. Also receiver side may introduce new data entry to use when need is observed.

According to an example embodiment, transmission time is used as one coding parameter to enable transmission of low power signals. A code table may be used at a transmitter and receiver to map different data to different transmission times, receiving times and/or other parameters. Advantageously, large amount of information may be transmitted with short and power efficient signals, for example to report status of a sensor every now and then, as planned in predetermined data. A receiver may use the same code table to decode the signals.

In one example embodiment the status of a sensor may have a coding table and the measurement data of sensor of IoT device or transmitter may have another different coding table. Then the receiver may have corresponding coding table for the status and another coding table for measurement data of sensor. For example, status is coded to be sent once a day at 12:00 pm, said transmission time indicating the status being active etc. For example, measurement data of sensor may be mapped to other different transmission times, or receiving times.

FIG. 1 illustrates an example of data communication system 100 comprising a transmitter 110 and a receiver 120. Even though devices 110 and 120 are referred to as transmitter and receiver, it is understood that devices 110 and 120 may be configured for unidirectional and/or bidirectional connection(s). A device may therefore operate either as a transmitter or receiver or both as a transmitter and receiver.

Transmitter 110 and receiver 120 may be configured to communicate over a network 130. Network 130 may be any suitable wireless or wired communication network, for example a cellular communication network such as a 3G, 4G, or 5G network. In some embodiments network 130 may comprise a direct radio link between transmitter 110 and receiver 120 such that a radio frequency signal is delivered from an antenna of transmitter 110 to an antenna of receiver 120. It is however appreciated that example embodiments presented herein are not limited to these example networks and embodiments may be applied in any present or future wireless or wired communication networks, for example other type of cellular networks or short-range wireless networks such as Wi-Fi or Bluetooth, or the like. In general, network 130 may comprise any means for enabling delivery of a signal from transmitter 110 to receiver 120.

Transmitter 110 may comprise for example a mobile phone, a smart phone, a tablet computer, a PDA (personal digital assistant), a laptop, a smart watch, an internet of things (IoT) device, or the like. Examples of IoT devices include, but are not limited to, sensors, tags, wearables, consumer electronics, and smart home appliances. In one example, transmitter 110 may comprise a vehicle such as for example a car, an unmanned vehicle, unmanned autonomous vehicle, or robot. In some example embodiments, such devices may alternatively, or additionally, include functionality of receiver 120, and they can be receiving, for example, navigation instructions to map different instructions data to different transmission times and/or other parameters. Different transmission time may indicate a planned transmission responsive to positioning data.

Receiver 120 may comprise a base station, an access point, a server, or the like. Receiver 120 may also comprise a mobile phone, a smart phone, a tablet computer, a PDA, a laptop, a smart watch, an IoT device, or the like. Communications between transmitter 110 and receiver may be therefore between any combination of handheld/mobile or fixed devices. Receiver 120 may be further coupled to one or more other devices over a wireless or wired connection, or for example via the Internet, to deliver the information received from transmitter 110 to the other device(s) for further processing. One or more sensor/s may be coupled, embedded, or integrated in transmitter, for example. One or more sensor/s may measure different quantities.

Figure 2:
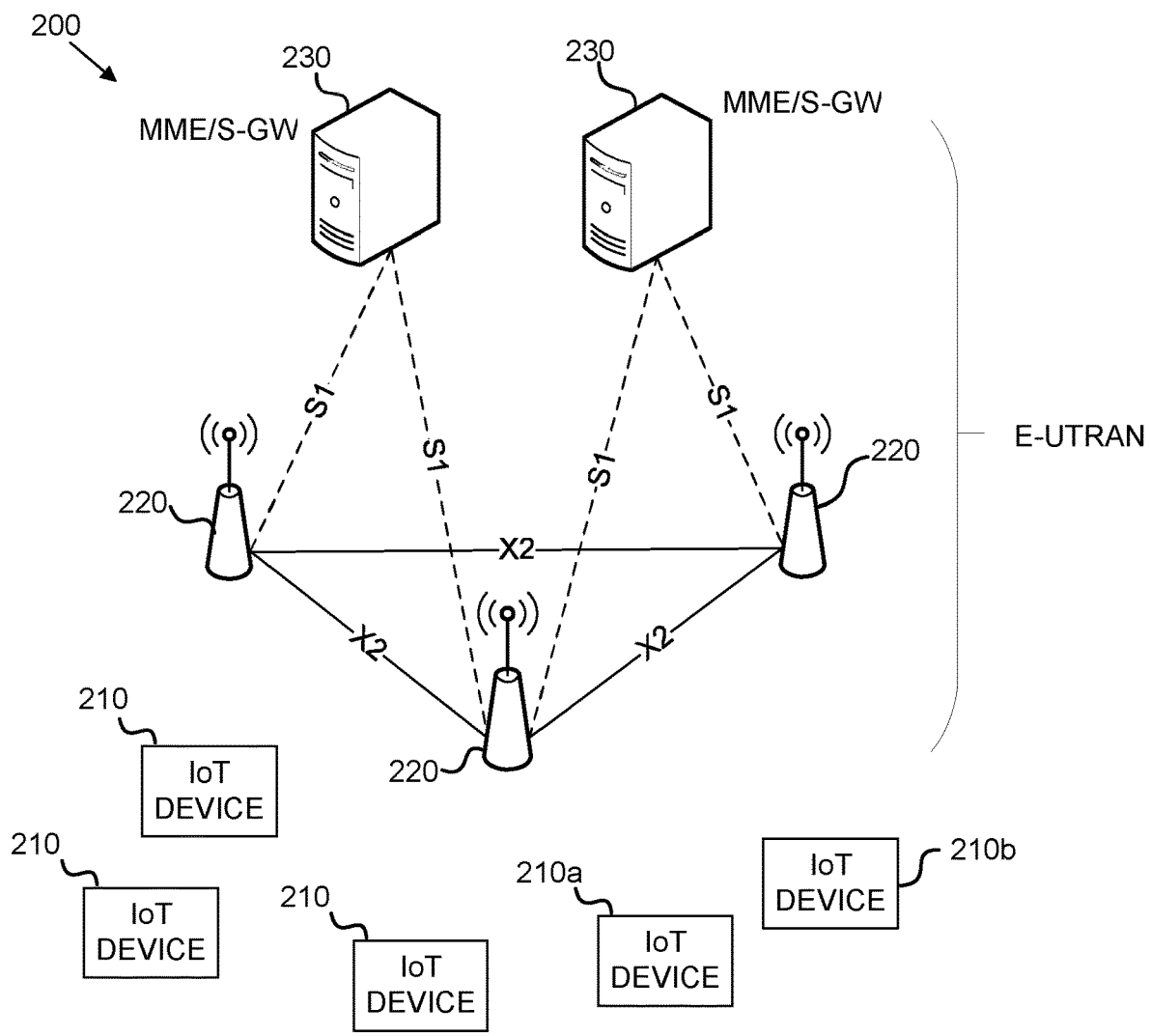
FIG. 2 illustrates an example of a wireless communication network, according to an example embodiment

FIG. 2 illustrates an example embodiment of a wireless communication network 200, which is provided as an example of network 130. Elements of FIG. 2 may be associated for example with the Evolved Universal Terrestrial Radio Access Network (E-UTRAN). The network 200 may comprise one or more core network elements such as for example Mobility Management Entity (MME) and/or Serving Gateway (S-GW) functions 230 and one or more base stations, represented by eNBs 220. The eNBs are provided as an example of receiver 120.

The network 200 may further comprise one or more client nodes, represented by IoT devices 210. IoT devices 210 are provided as examples of transmitter 110 The IoT devices 210 may be also referred to as user nodes or user equipment. E-UTRAN may comprise a plurality of eNBs 220 that provide E-UTRAN user plane and/or control plane protocol terminations towards IoT devices 210. User plane may be configured to communicate data according to one or more protocol layers including, but not limited to, a packet data convergence protocol (PDCP) layer, a radio link control (RLC) layer, a medium access control (MAC) layer, and a physical (PHY) layer. The control plane may be configured to carry control data according to one or more control protocols, for example a radio resource control (RRC) protocol. The eNBs 220 may communicate with each other over an X2 interface. The eNBs 220 may be further coupled to the Enhanced Packet Core (EPC), for example one or more MME/S-GWs 230, over an S1 interface. The S1 interface may be configured to support a many-to-many relationship between MMEs/S-GWs 230 and eNBs 220. One or more of the eNBs 220 may form an access point (AP) or a base station. The IoT devices 210 may be configured to transmit payload data to the eNB(s) 220 as one or more bits or bit groups on the user plane at a particular transmission time. Associated control signaling and configuration information may be carried on the control plane.

MME/S-GWs 230 and eNBs 220 may be generally referred to as network nodes or network devices. Although depicted as a single devices, a network node may not be a stand-alone device, but it may be implemented for example as a distributed computing system coupled to a remote radio head. For example, a cloud radio access network (cRAN) may be applied to split control of wireless functions to optimize performance and cost.

Network 200 may be alternatively configured for example in accordance with the 5th Generation digital cellular communication network, as defined by the 3rd Generation Partnership Project (3GPP). In one example, network 200 may operate according to or similar to one or more functions specified in 3GPP 5G-NR (5G New Radio) standard. For example, the network 200 may comprise one or more $5^{th}$ generation base stations (gNB) instead of eNBs 220.

Figure 3:
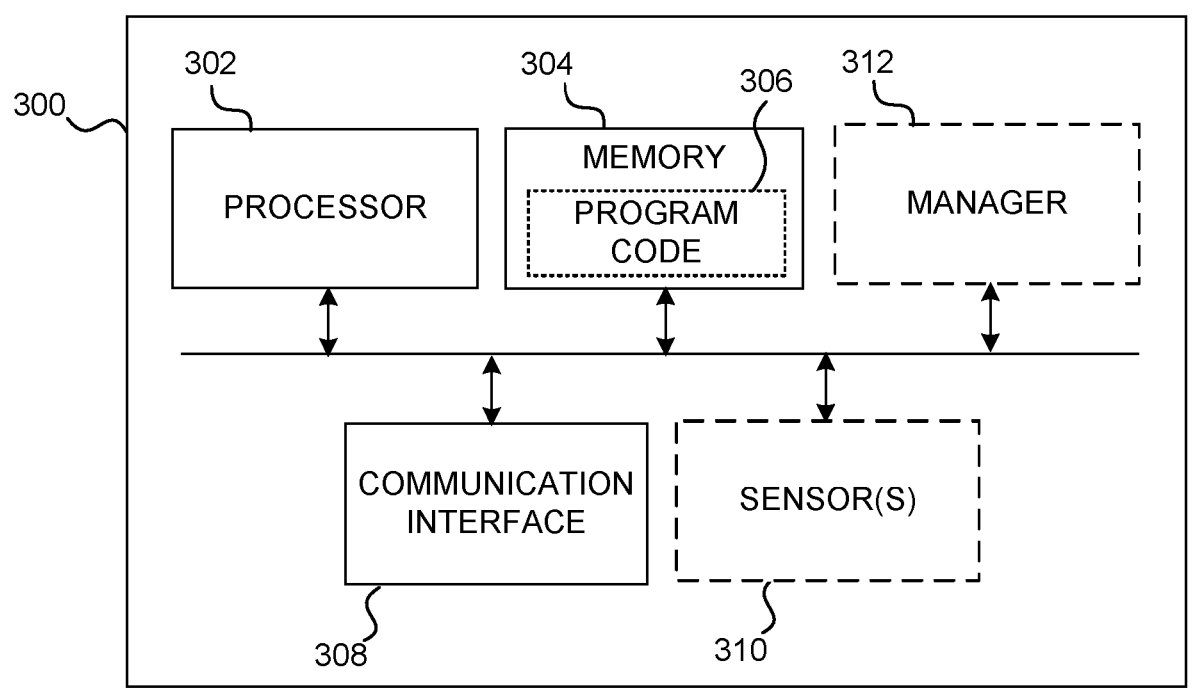
FIG. 3 illustrates an example of an apparatus configured to perform one or more example embodiments.

FIG. 3 illustrates an example of an apparatus 300, for example the transmitter 110 or receiver 120, the IoT device 210, or a base station such as for example an eNB 220. Apparatus 300 may comprise at least one processor 302. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus may further comprise at least one memory 304. The memory may be configured to store, computer program code 306, for example operating system software and/or application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 300 may further comprise communication interface 308 configured to enable apparatus 300 to transmit and/or receive information, for example signals, messages, information, or data to/from other devices. In one example, apparatus 300 may use communication interface 308 to transmit or receive information and data in accordance with at least one communication protocol. The communication interface 308 may be configured to provide at least one wireless radio connection, such as for example a 3GPP mobile broadband connection (e.g. 3G, 4G, 5G). Alternatively, or additionally, the communication interface 308 may be configured to provide one or more other type of connections, for example 5G, a wireless local area network (WLAN) connection such as for example standardized by IEEE 802.11 series or Wi-Fi alliance; a short range wireless network connection such as for example a Bluetooth, NFC (near-field communication), or RFID connection; a local wired connection such as for example a local area network (LAN) connection or a universal serial bus (USB) connection, or the like; or a wired Internet connection. Communication interface 308 may comprise, or be coupled to, at least one antenna or antenna array to transmit and/or receive radio frequency signals. One or more of the various types of connections may be also implemented as separate communication interfaces.

Apparatus 300 may further comprise one or more sensors 310 for retrieving information at the environment of apparatus 300. The sensors 310 may for example comprise at least one temperature sensor, at least one camera, at least one microphone, at least one accelerometer, at least gyroscope, at least one proximity sensor, or the like. In general, sensors 310 may comprise any device configured to detect information associated with apparatus 300. Information provided by the sensors 310 may be stored in memory 304 and/or transmitted via the communication interface 308.

Apparatus may further comprise a user interface, for example to enable manual configuration of the apparatus. Apparatus 300 may further comprise circuitry for detecting location of apparatus 300, such as for example a GPS (Global Positioning System) receiver, or any other suitable means for determining the location.

When the apparatus is configured to implement some functionality, some component and/or components of the apparatus, such as for example the at least one processor and/or the memory, may be configured to implement this functionality. Furthermore, when the at least one processor is configured to implement some functionality, this functionality may be implemented using program code 306 comprised, for example, in the memory 304. Although apparatus 300 is illustrated as a single device it is appreciated that, wherever applicable, functions of apparatus 300 may be distributed into a plurality of devices.

Alternatively or additionally in the example functions of apparatus 300 may be distributed into plurality of devices so that a first IoT device 210a may communicate with at least one eNB or access point 220. In this example the first IoT device 210a communicates towards eNB or access point 220 i.e. transmits signaling at a particular transmission time, which may for example comprise a particular time instant, time period, or time interval. The particular transmission time may be planned between the first device 201a and eNB or access point 220. The plan may be in a form of code table, for example. The code table may comprise transmission time, and corresponding data, and/or a link to corresponding data. Both first IoT device 210a and eNB or access point 220 comprise the corresponding code table. The function in the first device may comprise checking an indication for signaling corresponding the data. Indication may be used for analyzing and mapping a transmission or transmission time for the encoded data from code table. In this example, based on the checked signaling at particular transmission time by the first IoT device 210a, the eNB or access point 220 is able to see the data upon receipt of signalling by using corresponding code table.

Alternatively or additionally in this example functions of apparatus 300 may be distributed into plurality of devices so that a first IoT device 210a may communicate with at least one second IoT device 210b. Communication according to example embodiment between IoT devices saves batteries both transmitting IoT device and receiving IoT device because the data is indicated by simple and minimum transmission/receiving time consuming manner.

The second IoT device 210b communicates with the first IoT device 210a using wired connection (copper, optical) or wireless connection such as Bluetooth, WLAN, RF ID, 2G, 3G, 4G, 5G, 6G, for example, and transmits a message relating to signaling and/or meaning of the signaling when it has decided that signaling is to be transmitted. In this example, based on the signaling at particular transmission time by the second IoT device 210b, the first IoT device 210a is able to see from its second IoT device related code table the content of signalling. The first IoT device 210a further sends towards eNB 220 the second IoT device related signaling at particular transmission time. Based on the transmission time the eNB 220 knows that this signaling relates to the second IoT device 210b. There can be one or more IoT devices 210 connected to the first IoT device 210a which acts as a relay towards the network, for example eNB 220. Also other IoT devices 210 may communicate towards eNB 220 and there may be particular signaling roles given for IoT devices 210.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus comprises means for performing at least one method described herein. In one example, the means comprises the at least one processor, the at least one memory including program code configured to, when executed by the at least one processor, cause the apparatus to perform the method.

Figure 4:
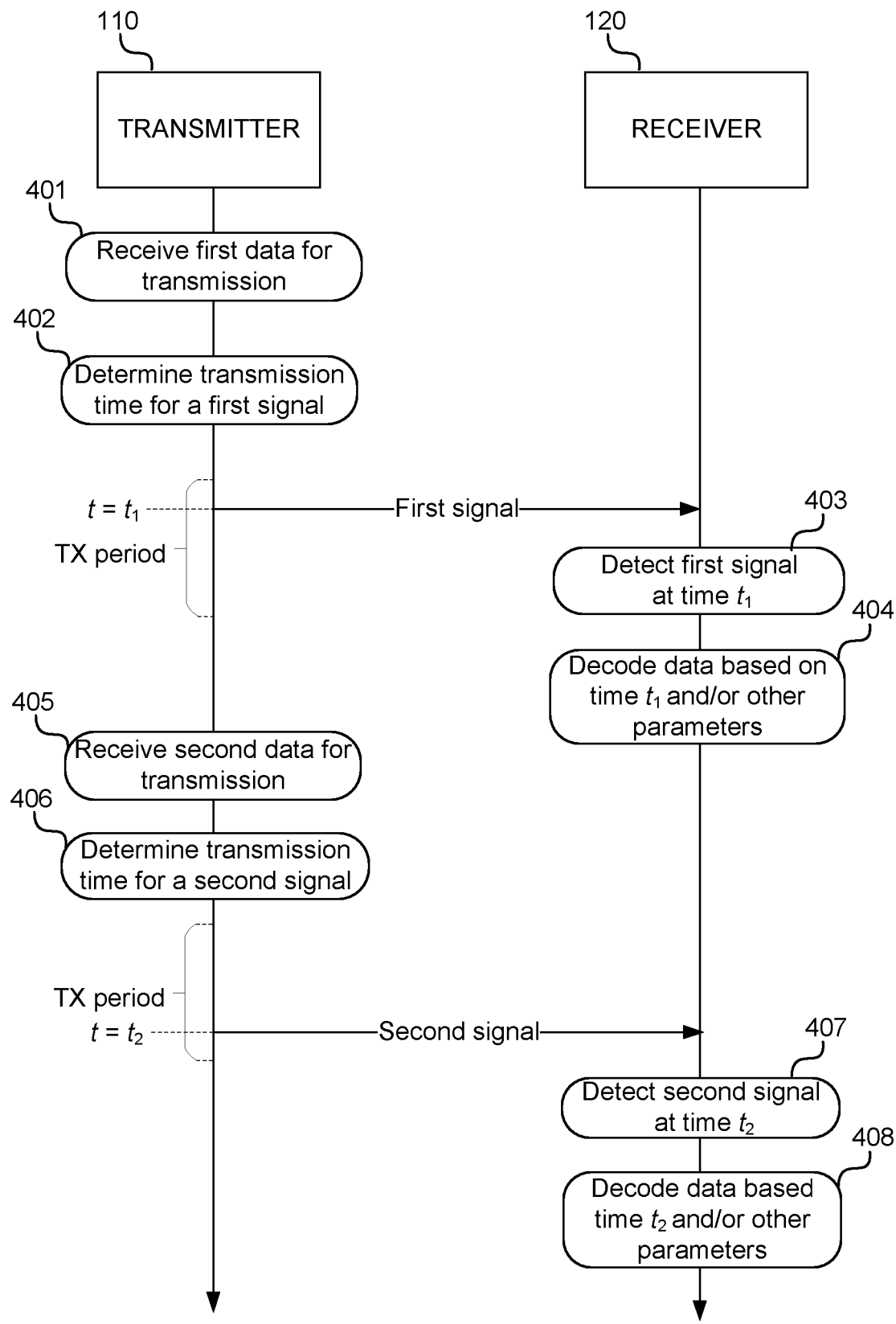
FIG. 4 illustrates an example of operations at a transmitter and a receiver, according to an example embodiment.

FIG. 4 illustrates an example of operations at transmitter 110 or receiver 120, according to an example embodiment. The procedure may be triggered for example in response to receiving first data for transmission at transmitter 110, at operation 401. Data may be received for transmission from one or more internal or external sources, for example from one or more sensors or data sources embedded in transmitter 110. The data subject to transmission may take various formats. For example, the data may comprise one or more sequences of bits, integer or floating point numbers, character strings, or the like.

The data subject to transmission may be also received from receiver 120 acting as a transmitter. For example, the receiver 120 may be eNB capable and hence able to transmit longer or more data. According to an example embodiment, the transmitter 110 may be configured to forward the data received from receiver 120 to another receiver. The transmitter may compress or change the received data according to the code, for example, to perform time encoding according to various example embodiments.

The transmitter 110 may be configured to encode data for transmission. Encoding may be based on determining a transmission time for a signal such that upon reception of the signal at a particular time, the receiver 120 is configured to decode the data based on the time of reception. For example, receiver 120 may be configured to interpret a signal received at a particular time in a particular way.

In one example embodiment the signal is encoded by the transmission time corresponding to the data or the value of data in the code table in the transmitter. The data received by the transmitter is not sent but the signal. In the receiver the signal is decoded. The transmission time or receiving time is decoded to the data or value of the data according to the code table.

At 402, transmitter 110 may determine a transmission time for a first signal based on the received first data. The content of the data may affect selection of the transmission time. A code comprising a mapping between the data to be transmitted and the transmission time may be provided for example in a code table, or other data structure. A code may associate a plurality of different transmission times with different data, for example a plurality of bit sequences, or other type of data. Different data may be mapped to different transmission times in one example embodiment.

Further embodiments may comprise that data comprising actual information or message of data in payload part of protocol may be reduced by encoding payload part as one of empty payload, a transmission time in payload, and a deleted payload, for example. In one example embodiment when no payload is sent the headers and metadata of the message are sent. The headers and metadata may comprise identifier of transmitter and receiver address, for example, with transmission time. The receiver may base at least one of the identifier and transmission time to get the payload decoded.

Transmission time and receiving time may be substantially same, for example. Substantially same receiving time may be used for decoding in example embodiment.

Data may be mapped to signal. Signal sent in specific time may represent specific data.

Transmission time may be encoded to payload part, as one example embodiment. The transmission time is sent in header and/or metadata and a part of payload. The reliability is enhanced. Receiver can operate to map the transmission time to data.

Transmission time may be provided in various formats. A transmission time may comprise a time instant or a time slot such as for example an interval of one second. Transmission time may be provided with reference to clock time. For example, an hour includes 3600 seconds. If transmission times are allocated with one second interval, 3600 different messages or meanings may be allocated for the interval of one hour. Capacity of data transmission increases as the transmission time interval decreases. For example, if transmission times are allocated with 1 ms intervals, 1000 different messages may be allocated for a period of one second. Various transmission time combinations such as a particular minute within an hour, particular second within a minute, or particular day within a year may be used. Any other available timing information may be also used instead of clock/calendar time. For example, transmission times may be allocated with respect to radio frames, or other transmission related timing parameters.

In general, a transmission time for particular piece of data may be selected from a plurality of slots within a period. For example, a period of one minute may comprise 60 slots having duration of one second. The period may be repeated such that transmitter 110 may update selection of the slot(s) if the data to be transmitted has changed. A period may be associated with a repetition interval. For example, the period of one minute may be repeated every day at midnight, which enables transmitter 110 to provide daily data updates. It is however noted that transmission times may be allocated without reference to any repeating interval. According to an example embodiment, a plurality of transmission times may be allocated for transmitting same type of data, for example as a list of transmission times. For example, transmission times 00:01:10, 08:03:45, and 16:05:27 may be allocated for transmitting an alarm from a particular sensor. Such pattern may be repeated on the next day, but alternatively any transmission times for the next day may be defined in the same list or a separate list.

A transmission time may be configured to directly indicate another quantity, for example one second and two seconds indicating one kilometer and two kilometers, respectively, or the transmission time may be configured with any other meaning.

Apparatus 300 may further comprise a manager 312. Manager may be implemented as a stand-alone logic circuitry or as part of the program code 306 embedded in memory 304, which is executable by processor 302. In one embodiment manager 312 may collect the data at particular time or by the particular time, from one or more sensors 310, for example. There is enough time reserved for the transmission at the transmission time $t_1$ agreed with transmitter and receiver. Transmission time $t_1$ is later than the particular time, and the difference may vary but it may be for example less than a second. Manager 312 may then decide based on the data either to activate transmission or not. Based on received data from sensors 310 the manager 312 may compare the data for a sensor specific code table and activate transmitter at transmission time $t_1$ when sensor specific code table shows transmission time $t_1$ for that code table content.

Referring to FIG. 4, at 402 transmitter 110 may determine that a signal is to be transmitted at transmission time $t_1$. The signal may be a predetermined signal, such as for example bit value 1 according to any suitable communication protocol. According to an example embodiment, receiver 120 may detect the signal based on received power at its antenna and therefore content or format of the signal may not be relevant in all example embodiments. This approach may be applied for example in environments where interference from other energy sources is low.

According to an example embodiment, data may be further encoded into at least one characteristic of the signal. For example, both the at least one characteristic of the signal and the transmission time may be determined based on the data. The encoded data may be transmitted at the transmission time. This enables allocating different data, for example different bit sequences to the same transmission time. Thereby the capacity of the communication channel may be increased.

According to an example embodiment, the at least one characteristic of the signal may comprise a bit value or values of a group of bits. For example, if the signal comprises a group of four bits, sixteen different messages or meanings may be allocated to the same transmission time. Other characteristics that may be modified based on the data include for example amplitude, power, phase, or frequency of the signal. This enables further increasing the capacity of the communication channel.

The amount of transmitted bits, or in general the format of the signal, may be determined based on various conditions, for example the number of available transmission times and the amount of information to be transmitted. The amount of transmitted bits may be also determined based on network traffic load and radio channel characteristics. For example, a lower amount of bits may be used if radio channel is poor and a higher amount of bits may be used if the radio channel is good.

According to an example embodiment the number of bits may be determined based on one or more radio transmission parameters, for example a modulation. This enables maximizing the amount of bits for a certain transmission time. For example, if the signal is modulated using 16-QAM, the signal has capacity to carry four bits by one symbol and therefore providing information in a group of three bits may not be optimal. In this case, determining to transmit four bits optimizes the transmission and allows to reserve less transmission times for particular type of information.

According to an example embodiment, the transmission time $t_1$ may be determined within a transmission (TX) period, as illustrated in FIG. 4. The transmission period may for example comprise a first minute of a day. Based on the first data to be transmitted the transmitter 110 may for example determine the first signal is to be transmitted at 00:00:04, that is, during the fifth second of the day.

Before transmission time $t_1$ the transmitter 110 may establish a connection to receiver 120, for example an eNB 220. At transmission time $t_1$ the transmitter 110 may transmit the first signal to receiver 120.

At 403, the receiver 120 may receive the first signal and also detect the reception time $t_1$. Reception time $t_1$ may be for example stored in the memory of receiver 120. It is noted that transmitter 110 and receiver 120 may operate with substantially same time base such that messages may be encoded or decoded based on the transmission or reception times. Transmitter 110 and receiver 120 may synchronize their clocks based on signals received from external sources such as satellites, or by any other suitable means.

In the embodiments substantially same time between the transmission time and reception time may be less than one second difference and sometimes a couple seconds difference. Typically the transmission time of transmitter and reception time of the receiver is substantially same.

Receiver 120 may be configured to be powered on, or in general to enter a state where receiver 120 is capable of receiving a signal, for the transmission time period. However, according to an embodiment receiver 120 may be configured to be switched off or to enter a low power state in response to receiving the first signal. This enables power saving at the receiver 120. Therefore, allocation of data, for example different warnings, to different transmission times may be based on a probability of needing to transmit the data. For example, data indicating a more probable warning may be allocated to the beginning of the transmission period and a less probable warning may be allocated to the end of the transmission period. In general, allocation of data within a transmission period may be based on an expected frequency of occurrence. This enables to improve power saving at the receiver 120.

At 404, the receiver 120 may decode data based on the detected reception time $t_1$. For example, receiver 120 may have stored the same code table that was used in transmitter 110 and determine which data, for example a sequence of bits, corresponds to the reception time $t_1$ and/or the at least one characteristic of the signal. Other parameters such as source identifier of transmitter 110, a beam associated with reception of the signal, or an angle of arrival of the signal may be used in decoding the data, as will be further described in connection with FIG. 6.

At 405, transmitter 110 may receive second data for transmission. The second data may be different from the first data and therefore transmitter 110 may determine a second transmission time $t_2$ for transmitting the second data, at operation 406. The second transmission time $t_2$ may be different from the first transmission time $t_1$ within the repeating transmission period. Based on the second data to be transmitted the transmitter 110 may for example determine the second signal to be transmitted at 00:00:44, that is, during the 45$^{th}$ second of the next day. In this example, the repetition interval of the TX period is one day and one signal is transmitted during a TX period. However, transmitter 110 may be also configured to transmit a plurality of signals within the same transmission period to provide different information, for example different messages. More information may be thereby provided within the same transmission period. This approach may be used for example if the different transmission times within the same transmission period are allocated to mutually independent messages.

According to an example embodiment, a plurality of transmission times may be allocated to same data. This enables repetition transmission of the same data to ensure more reliable data transmission between transmitter 110 and receiver 120. For example, transmission time $t_1$ may correspond to Data, next transmission instant $t_2$ may correspond to same Data 1, and a further transmission time $t_3$ correspond to same Data 1. A receiver may decode Data 1 based on receiving a signal at one or more of the allocated transmission times $t_1$, $t_2$, $t_3$.

At 407 and 408, receiver 120 may receive the second signal and decode data based on reception time $t_2$, similar to operations 403 and 404 where data is decoded based on reception time $t_1$.

FIG. 5 illustrates an example of a code table. The code table may comprise a data column, one or more code columns and one or more information columns. A data column may for example indicate one or more bits or bit sequences, as provided in the first column of FIG. 5. The code columns may indicate one or more coding parameters such as for example a transmission time, a source identifier, or a reception direction. Reception direction may be expressed for example as a beam identifier, an angle of arrival, or a range of arrival angles. The code columns may be associated with one or more logical operators such that different combinations of the coding parameters may be allocated to different data. The code table may further comprise one or more information columns, which indicate the meaning of the data provided in the data column and which is subject to encoding based on the one or more code columns. An information column may for example include a written message or a hexadecimal bit sequence that corresponds to the transmitted data and the code. Furthermore, one information column may indicate meaning of the hexadecimal representation of the data.

In the example of FIG. 5, data is encoded into the transmission time and the bit value. In such case the code table may not include all the columns presented in FIG. 5. For example, if the content or format of the signal is irrelevant, the code table may include transmission time in a column and one information column indicating meaning of the coded message. In another example, the code table may include transmission time in column, a signal format in a column (e.g. a bit column), and one information column indicating the meaning of the coded message. It is also understood that the table of FIG. 5 may form a part of a larger table containing other information. For example, the table of FIG. 5 may be combined with tables of FIG. 7 and/or FIG. 8 to obtain a single code table.

In example embodiments in the receiver tables of FIGS. 5, 7 and/or 8 may indicate an association to data corresponding transmission time. Association may be provided by a link to server or computer memory, for example. The data may be large and therefore the data may be located outside the table, for example. In reception, the receiving time or transmission time may be extracted and corresponding link is found based on transmission or reception time. By using link, the data will be found and displayed or used in other ways.

In example embodiment the transmitter may store data, for example IoT device data, in the memory or storage of transmitter. The transmitter may control the stored data and relevancy to transmission time. The table of transmitter may provide an association to data via a link, for example URL, or file location, in coding table to the memory or storage of transmitter. To determine relevancy of the stored data to the transmission time may comprise a predetermined rule, for example, how to determine whether to transmit signal. Rule may comprise matching of one of exact data, part of data, and/or link to stored data. After data in the memory or storage of transmitter has changed, matching check is initiated. If match is found between one of predetermined exact data, part of data or link and changed data is found, a transmission by using signal based on the data at the predetermined time, data part of data or link is being encoded into the transmission time.

Example of high volume data is video, audio or image. Any of these data will comprise e.g. a face of a person or an object. Based on analysis concluding that the face of a person or an object is recognized in video, audio or image, that may be mapped to transmission time. The message is sent from transmitter to receiver at the predefined transmission time. Receiver may map the signal by using transmission time to a data found in receiver code table. Receiver may then know data is relating to a face of a person or an object, for example.

According to an example embodiment, data may be encoded or decoded based on not transmitting or receiving a signal at a particular time. Even if no information is sent, the receiver may interpret non-reception as indication of something as agreed beforehand. For example, signaling bit "1" at 12:00:00 may be mapped to Data 1, signaling bit "0" at 12:00:00 may be mapped to Data 2, and not transmitting a signal at 12:00:00 may be mapped to Data 3. In this example embodiment, Data 3 does not consume any transmission power or radio resources, because silence at a particular time is an indication of Data 3. A receiver may be configured to decode certain data based on not receiving a signal at a particular time. Association between the data and the silent time may be indicated in the code table.

In FIG. 5, two different messages "Request for maintenance within a day" and "Request for maintenance as soon as possible" are allocated to the same transmission time 12:00:00. These messages are distinguished by the bit value "0" or "1". This example provides an IoT device an opportunity to indicate its need for maintenance with a short one bit signal. Further transmission times may be allocated to different messages. For example, transmission time 12:02:00 may be allocated to requesting predetermined information, transmission time 12:03:00 may be allocated to requesting an updated code table, and/or transmission time 16:06:00 may be allocated to indicating that a predetermined parameter, such as for example temperature, is below or above a predetermined threshold. Furthermore, transmission time 07:00:00 may be allocated to requesting to start factory (day shift) with a predetermined parameter set XYZ. Subsequent transmission times may be allocated to requesting to start factory with different parameter sets. Similar requests may be allocated around 16:00:00 and 22:00:00 for evening and night shifts, respectively.

Figure 6:
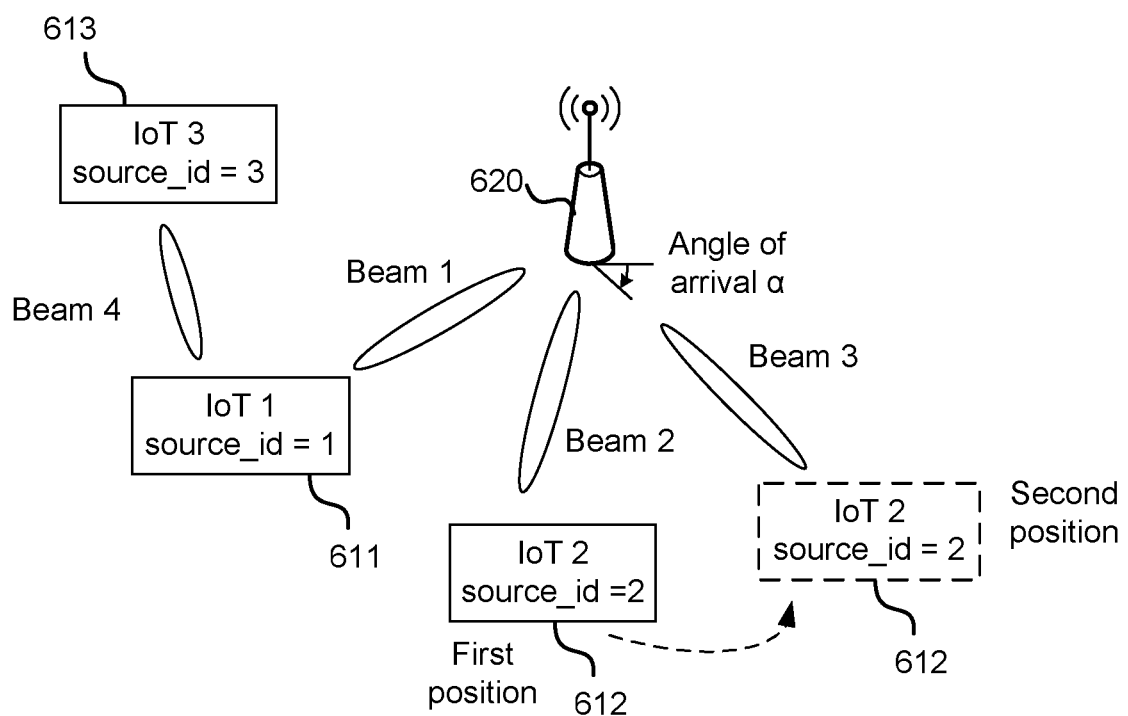
FIG. 6 illustrates an example of encoding or decoding data based on different source identifiers, beams, and/or arrival angles, according to an example embodiment.

FIG. 6 illustrates an example of encoding or decoding data based on different source identifiers, beams, and/or arrival angles. The example system of FIG. 6 may comprise a base station 620, provided as an example of receiver 120, and one or more IoT devices 611, 612, 613, provided as examples of transmitter 110 and configured with source identifiers source_id=1, source_id=2, and source_id=3.

According to an example embodiment, data may be encoded to, or decoded based on, a source identifier of a transmitter. For example, different data may be allocated for a first IoT device 611 and a second IoT device 612. The signal transmitted at a particular transmission time may comprise the source identifier. Based on the source identifier the receiver 620 may interpret the signal as defined in a code, for example a code table. This enables allocating same transmission time for more than one device. According to an example embodiment, transmitters may use the source identifier to encode data. For example, IoT device 611 may be configured to send a signal in response to detecting a first event, for example status "door closed" and IoT device 612 may be configured to send a signal in response to detecting another event, for example status "door open". IoT devices 611 and 612 may be configured to determine whether to transmit a signal based on its identity. For example, if a source identifier allocated for a particular message in the code table corresponds to the identity of the IoT device, the IoT device may determine to transmit the signal when the condition in the message is satisfied. If a source identifier allocated for a particular message in the code table corresponds to the identity of the IoT device, but the condition defined in the message is not satisfied, the IoT device may determine not to transmit the signal. The transmitted signal may include the source identifier. Data is thereby encoded into the source identifier.

In response to receiving a signal comprising a particular source identifier, receiver 620 may decode the signal based on the source identifier and the code table, which indicates the data allocated for the received source identifier. In further example embodiments data may be encoded to, or decoded based on, a combination of source identifier and one or more other parameters, such as for example a transmission time, at least one characteristic of the signal, a beam, and/or an angle of arrival. The source identifier may not be associated with identity of an entire IoT device. In some example embodiments, the source identifier could identify for example a particular transmitter or antenna of an IoT device.

Transmitter 110 and receiver 120 may be configured to communicate data using one or more beams. A directive beam may be for example generated based on adjusting relative amplitude and phase shifts in an antenna array. This is generally referred to as beamforming. For example, in cellular communication systems beamforming may be used to assign different users to different beams to increase capacity of the network by optimizing radio link conditions for each user. As illustrated in FIG. 6, a first IoT device 611 may communicate with base station 620 with Beam 1 and/or with a third IoT device 613 with Beam 4. A second IoT device 612 may communicate with base station 620 with Beam 2, when the second IoT device is in a first position. After moving to a second position, the second IoT device 612 may communicate with base station 620 with Beam 3. Each beam may be associated with an angle of arrival at base station 620. However, it is noted that any signal received at base station 620 may be associated with an angle of arrival, regardless of the use of any beamforming technology. It is further noted that beamforming can be vertical or horizontal. For example, a first beam or a first angle of arrival detected in vertical direction may correspond to first data. A second beam or a second angle of arrival in horizontal direction may correspond to second data. Therefore, selection of beam or arrival angle at an IoT device may comprise determining a location and/or a height for transmitting a signal, for example in order to encode data in vertical beam or angle of arrival.

According to an example embodiment, data may be encoded to, or decoded based on, a beam used to transmit a signal. For example, if base station 620 receives a signal with Beam 1, it may be configured to interpret the signal to carry first data, for example a request to perform a first operation. If the base station 620 receives the signal with Beam 2, it may be configured to interpret the signal to carry second data, for example a request to perform a second operation. According to an example embodiment, detection of the signal may be based on detecting energy at the base station from Beam 1 and/or Beam 2 irrespective of other parameters, for example the source identifier. For example, in response to detecting energy from a particular beam, base station 620 may be configured to trigger a predetermined operation. Note that if first and second IoT devices 611, 612 are moving, both of them may be capable of using both Beam 1 and Beam 2 depending on the locations of the first and second IoT devices 611, 612 at a particular time.

IoT device 612, or in general any transmitter, may be configured to encode data into the selection of the beam. For example, a first message may be allocated to a first beam and a second message may be allocated to a second beam. When transmitting the signal, the available beam may be determined based on location of the IoT device 612, for example geographical coordinates provided by GPS. A particular beam is generally available at a particular location. However, if there are multiple base stations 620, multiple beams may be available at a single location. Based on the location the IoT device 612 may determine the available beam(s). IoT device 612 may then determine whether to transmit a signal based on whether the beam allocated for the data to be transmitted corresponds to an available beam, for example based on the code table. The IoT device 612 may further determine to postpone transmission until the selected beam is available. The IoT device 612 may also determine to move to a location where the selected beam is available and transmit the signal there. In general, a transmitter may select a beam based on the data and transmit a signal using the selected beam. Data is thereby encoded into the selection of the beam. In further example embodiments data may be encoded to, or decoded based on, a combination of the selected beam and one or more other parameters, such as for example a transmission time, at least one characteristic of the signal, and/or a source identifier.

According to an example embodiment data may be encoded to, or decoded based on, an arrival angle at a receiver, for example at base station 620. As illustrated in FIG. 6, Beam 3 may be associated with an angle of arrival a at base station 620. However, also signals not associated with any beams may be associated with an angle of arrival at base station 620. The angle of arrival may be used as a further code dimension. For example, if base station 620 receives a signal with an angle of arrival between 0 and 90 degrees, it may be configured to interpret the signal to carry first data, for example a request to perform a first operation. If the base station 620 receives the signal with an arrival angle between 90 and 180 degrees, it may be configured to interpret the signal to carry second data, for example a request to perform a second operation.

Similar to beams, transmitting a signal at different locations causes the signal to be received at base station 120 with different arrival angles. An IoT device may therefore determine a resulting arrival angle based on its location. For example, based on its location IoT device 612 may determine which arrival angle would result from transmitting the signal at its current location. The IoT device 612 may then determine whether to transmit a signal based on whether the angle of arrival allocated for the data to be transmitted corresponds to the available angle of arrival, for example based on the code table. The IoT device 612 may further determine to postpone transmission until the desired angle of arrival is available. The IoT device 612 may also determine to move to a location where the desired angle of arrival is available and transmit the signal there. In general, a transmitter may determine a transmission location based on a desired arrival angle at a receiver. The desired arrival angle may be determined based on the data to be transmitted. In response to determining that the transmitter is at the transmission location, the transmitter may transmit the signal. Data is thereby encoded into the selection of the arrival angle and/or transmission location. In further example embodiments data may be encoded to, or decoded based on, a combination of an arrival angle and one or more other parameters, such as for example a transmission time, at least one characteristic of the signal, and/or a source identifier.

According to an example embodiment, when IoT device 612 is mobile, bypassing a particular beam may be configured to trigger a particular operation at base station 620. Bypassing a particular beam at a particular time may be configured to trigger a particular operation at base station 620. Furthermore, not bypassing a particular beam, for example at a particular time, may be configured to trigger a particular operation at base station 620.

FIG. 7 illustrates an example of a code table, wherein information encoded into transmission time corresponds to a bit sequence. According to an example embodiment, a plurality of transmission times may be allocated to different combinations of a bit sequence. For example, status from 8 door sensors may be provided as a sequence of eight bits, which may be represented by a hexadecimal value from the range of $00_{HEX}$ to $FF_{HEX}$. Bit value 1 of the bit sequence may for example refer to an open door and bit value 0 may refer to a closed door. Eight doors may be arranged in 256 different open/closed combinations and therefore 256 transmission times may be allocated at one second intervals between 12:10:00 and 12:14:15. Furthermore, bit value 0 of the transmitted signal may define that the corresponding hexadecimal representation of a bit sequence is associated with door status. If the bit value of the transmitted signal is 1, the same transmission times may be interpreted as alarm status from eight different sensors, as further illustrated in FIG. 7. In another example, sixteen one second transmission times from 16:05:00 to 16:05:15 may be allocated for an opportunity to request switching any of four lamps to be switched on or off.

In general, an arbitrarily long bit sequence, for example a bit sequence of one million bits, may be mapped to a single transmission time. This enables very efficient communication because by selecting a particular transmission time a large information package may be delivered from the transmitter to the receiver. This approach takes advantage of the irregular nature of IoT communications. For an IoT device the delay in delivering the data may not be that important, while the power consumed to the transmission may play a critical role. By allocating large amounts of different data to short time instances it is possible to trade between the delay and required transmission power. This enables to save both battery power and radio resources.

FIG. 8 illustrates an example of a code table, wherein data is encoded into different combinations of transmitted bit(s), transmission time, source identifier, and/or reception direction. For example, Operations 1 and 2 may be requested by transmitting bit "1" either using Beam 1 or Beam 2. In this example, the transmission time is irrelevant as long as it does not coincide with any of the transmission times defined for other data in the code table. Operations 3 and 4 may be requested by transmitting bit "1" at transmission time 12:00:00 and using either Beam 1 or Beam 2 to transmit bit "1". At transmission time 12:01:00 Operation 5 may be requested by IoT 1 by using Beam 1 to transmit bit "1" and Operation 6 may be requested by IoT 2 by using Beam 2 to transmit bit "1". At transmission time 12:10:00 IoT 3 may request either Operation 7 or Operation 8 by transmitting bit "1" at a location that results in either arrival angle 1 or arrival angle 2 at the receiver. Code tables of FIG. 7 and/or FIG. 8 may be combined with other code tables to obtain a single code table containing various different messages encoded with various combinations of the code parameters.

The code table may be available for both the transmitter 110 and receiver 120. For example, transmitter 110 and receiver 120 may be preconfigured with one or more code tables. The code table may be adaptive. For example, one or more code table updates may be received at transmitter 110 and receiver 120. An update may comprise receiving an updated code table or an updated portion of a code table such that deviations to a previous code table may be signaled. A code table may be updated by various means such as for example via a wired or wireless communication interface, a user interface, or the like. Updates to the code table may be determined manually or they may be provided by an artificial intelligence (AI) system that learns parameters from the surrounding world. Even though the example embodiments of FIG. 5, FIG. 7, and FIG. 8 represent the code in a table format, it is appreciated that a mapping between the one or more code parameters and the data to be transmitted may be provided in any suitable format.

According to an example embodiment, an IoT device may be configured to perform a particular operation for a particular time. For example, the IoT device may be configured to count traffic for year 2019. The IoT device may be configured to report the traffic on Jan. 1, 2020, for example as follows. Signaling a bit at 12:00 means that traffic amount reached 100000, signaling a bit at 12:01 means that traffic amount reached 150000, signaling a bit at 12:02 means that traffic amount reached 20000, etc. Furthermore, different transmission times may be reserved for transmissions to different receivers. A receiver, for example eNB, may be configured to interpret a bit received at a particular time, for example at $t_1$, as a particular amount of traffic. This, one bit per year is sufficient for signaling amount of traffic. Similar approach may be applied also in factory production or as part of production line follow-up. In this example, information received may be used for steering raw material logistics, for example.

According to an example embodiment, the transmission time, for example a clock time such as a particular second, may be directly mapped to a code value, for example another quantity, such that transmission time means particular quantity directly, depending on the application. For example, transmission second may be interpreted as distance in kilometers such that 00:00:00=0 seconds=0 kilometers,
    00:00:01=1 seconds=1 kilometers,
    00:00:02=2 seconds=2 kilometers, etc.,
    00:01:01=61 seconds=61 kilometers, etc.,
    01:00:00=3600 seconds=3600 kilometers,
    01:00:01=3601 seconds=3601 kilometers, etc., and
    23:59:59=86399 seconds=86399 kilometers.

An IoT device may be for example configured to collect driven kilometers on a car during a time period, for example one month. Based on a signal transmitted at a particular second, a receiver may directly determine the distance in kilometers. For example, based on receiving a signal at 01:00:01 a receiver may determine that 3601 kilometers were driven during the previous month. Therefore, one bit per month is sufficient for monthly reporting of number of kilometers.

According to an example embodiment, counting of the transmission time may begin from a particular or signaled start time. The transmission time in seconds may be for example counted from the beginning of an earlier day such that the transmission time, and thereby also the value for the other quantity, is obtained based on the current time and the number of seconds of the earlier day. For example, addition of the current time 00:00:05 and the number of seconds at the earlier day 86399 results in 86404 seconds, which may be directly translated to 86404 kilometers. As another example, the transmission time in seconds may be for example counted from the beginning of an earlier year such that the transmission time, and thereby also the value for other quantity, is obtained based on the current time and the number of seconds of the earlier year. Any other periods of transmission time and start times for counting the elapsed time may be used.

According to an example embodiment, data values, or a subset thereof, may be encoded or decoded based on a function of the transmission time, for example as addition of a value to the current time, subtraction of a value from the current time, multiplication of the current time by a scaling factor, or dividing the current time by some value. The transmission time may be provided as the transmission second within a minute or an hour, the transmission hour within a day or week, or any suitable time period within a reference time period.

According to an example embodiment, different subsets of the data values may be encoded or decoded based on different functions of the transmission time. For example, a first subset of data values may be encoded or decoded based on a first function of the transmission time, for example as directly mapped to the transmission time. At least one second subset of data values may be encoded or decoded based on a second function of the transmission time, for example based on multiplying the transmission time by a scaling factor, or the like. A plurality of functions may be applied to a plurality of subsets of transmission times.

As an example of addition, transmission times may be mapped to data values by adding 100 seconds to the current time 00:00:05. For example, the current time may be translated to 00:00:05+100 seconds=105 seconds, which may be mapped directly to another quantity such as 105 kilometers.

As an example of subtraction, transmission times may be mapped to data values by subtracting 25 seconds from the current time 00:00:05. For example, the current time may be translated to 00:00:05-25 seconds=-20 seconds, which may be mapped directly to another quantity such as for example temperature of -20° C. This may be used for example to signal negative values.

As an example of multiplication, transmission times may be mapped to data values by multiplying the current time 00:00:05 by 500. For example, current time may be translated to 00:00:05×100=500 seconds, which may be mapped directly to another quantity such as for example 500 kilometers.

As an example of division, transmission times may be mapped to data values by dividing the current time 00:00:05 by 200. For example, the current time may be translated to 00:00:05/200=0.025 seconds, which may be mapped directly to another quantity as a decimal value.

Any suitable function(s) may be used to derive the data values mapped to particular transmission times. The function(s) may be predetermined and known to both transmitter 110 and receiver 120, or they may be received via a communication interface or configured manually.

According to an example embodiment, a reference signal may indicate a function to be applied in encoding or decoding the data. A reference signal, or the signal itself, at a particular transmission time may be used to indicate change of handling mode or operating mode for further transmission or reception times. For example, a signal transmitted or received at time 00:00:06 may indicate that multiplication by 200 is to be applied to upcoming transmission or reception times. Alternatively, a reference signal may inform the receiver that one or more following signals carry particular type of information, for example an indication of an operation mode or a function to be applied when decoding signals. The operation mode may be for example associated with interpreting a further signal in a particular way, for example using a different code table. The transmitter and receiver may store parallel code tables for same transmission time(s). A receiver may select one of the code tables for example based on a preceding signal that indicates which of the tables is to be used.

Figure 9:
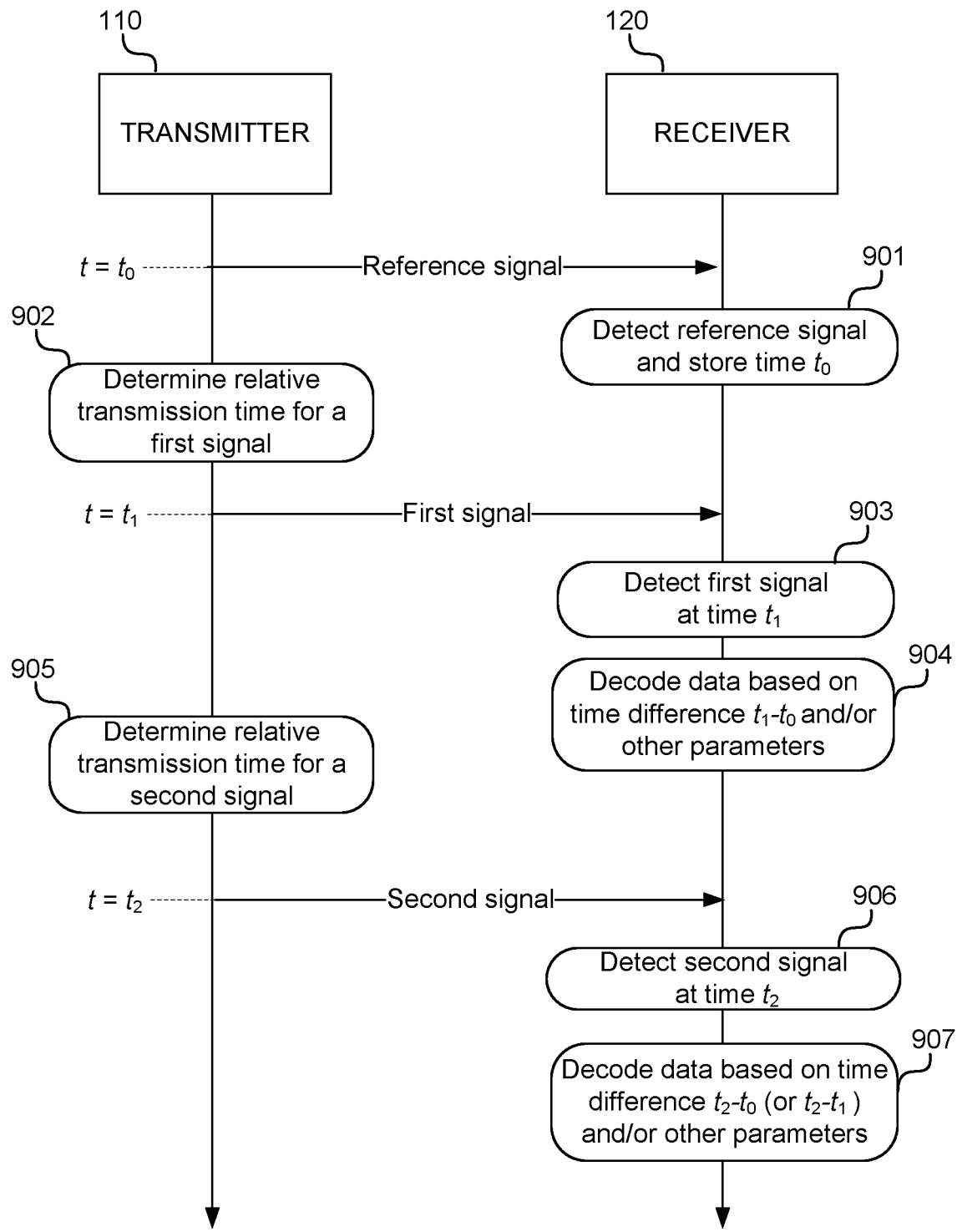
FIG. 9 illustrates an example of operations at a transmitter and a receiver when information is encoded into relative transmission time, according to an example embodiment.

FIG. 9 illustrates an example of operations at transmitter 110 and receiver 120 when information is encoded into relative transmission time. At transmission time $t_0$ transmitter 110 may transmit a reference signal. At operation 901, receiver 120 may receive the reference signal 901 substantially at $t_0$. Receiver 120 may store the reception time $t_0$ in its memory as a reference time for decoding further signals. Transmitter 110 may encode the reference signal with particular signal format (e.g. bit value(s)), source identifier, beam, or angle of arrival. Desired source identifier may be selected by determining to transmit the reference signal by a predetermined device. Encoding the signal as a reference signal may comprise selecting a code parameter combination allocated for a reference signal in a code table. At receiver 120 a reception time may be stored as reference for further signals in response to determining that the signal is a reference signal, for example based on the code table. Transmitting the reference signal may be in response to determining that transmitter 110 has received data for transmission.

At 902, transmitter 110 may determine a relative transmission time for a first signal. Similar to operation 402, the transmission time may be determined based on the data to be transmitted and the code table. However, in this example embodiment the code table may indicate a relative transmission time to the reference signal. At transmission time $t_1$ the transmitter 110 may transmit the first signal encoded with the data. A relative transmission time may comprise a time between a reference signal and a transmission time, for example the time between $t_1$ and $t_0$.

At 903, the receiver 120 may receive the first signal and also detect the reception time $t_1$. Reception time $t_1$ may be stored in the memory of receiver 120.

At 904, the receiver 120 may decode data based on a difference between the detected reception time $t_1$ and the reception time $t_0$ of the reference signal. For example, receiver 120 may have stored the same code table that was used in transmitter 110 and determine which data, for example a sequence of bits, corresponds to the difference between the reception time $t_1$ and reference time $t_0$. Other parameters such as at least one characteristic of the signal, a source identifier, a beam associated with reception of the signal, or an angle of arrival of the signal may be used in decoding the data.

At 905, transmitter 110 may determine a relative transmission time for a second signal. Similar to operation 902, the transmission time $t_2$ may be determined based on the data to be transmitted and the code table. The code table may indicate a relative transmission time to the reference signal transmitted at $t_0$. Alternatively, the code table may indicate a relative transmission time to the previous signal transmitted at $t_1$.

At 906, receiver 120 may receive the second signal. Receiver 120 may detect reception time $t_2$. Receiver 120 may store the reception time $t_2$ in its memory.

At 907, the receiver 120 may decode data based on a difference between the detected reception time $t_2$ and the reception time $t_0$ of the reference signal. Alternatively, receiver 120 may decode data based on a difference between the detected second reception time $t_2$ and the first reception time $t_1$ of the previous signal. For example, based on the code table receiver 120 may determine the data corresponding to the difference between the second reception time $t_2$ and reference time $t_0$, or the difference between the second reception time $t_2$ and the first reception time $t_1$. Other parameters such as for example at least one characteristic of the signal, a source identifier, a beam associated with reception of the signal, or an angle of arrival of the signal may be also used in decoding the data.

Various example embodiments disclose methods, computer programs and apparatuses for bit-time coding of information to enable low power transmission of large amount of information.

Figure 10:
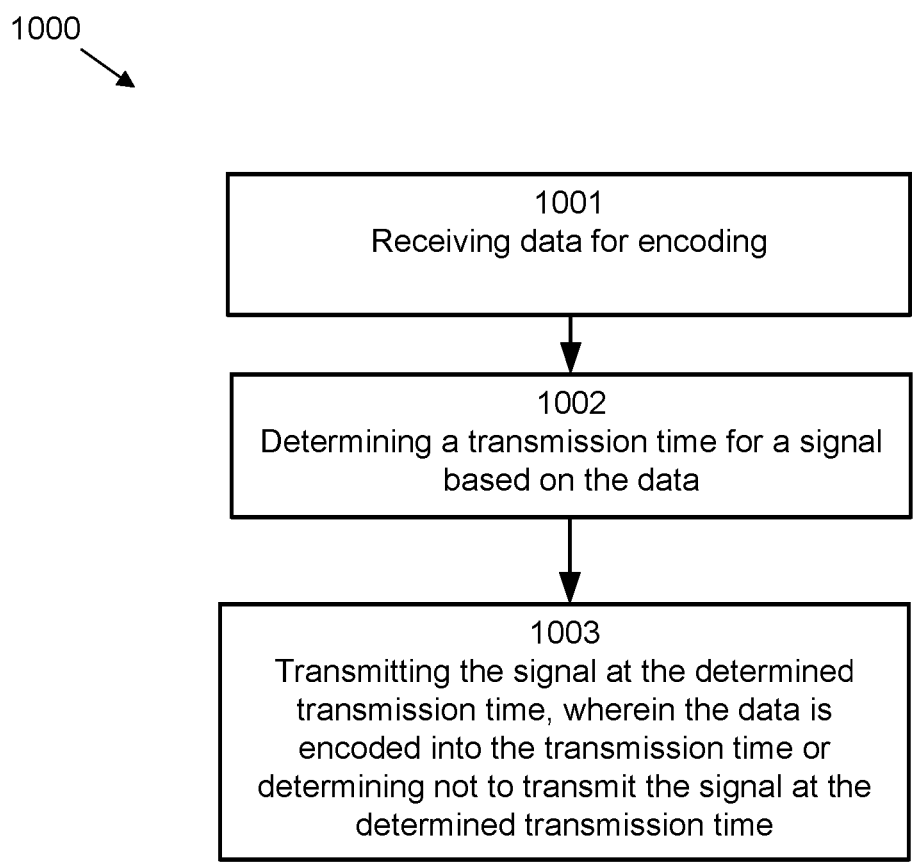
FIG. 10 illustrates an example of a method for encoding a signal, according to an example embodiment.

FIG. 10 illustrates an example of a method 1000 for encoding a bit-time coded signal, according to an example embodiment.

At 1001, the method may comprise receiving data for encoding.

At 1002, the method may comprise determining a transmission time for a signal based on the data.

At 1003, the method may comprise transmitting the signal at the determined transmission time, wherein the data is encoded into the transmission time, or determining not to transmit the signal at the determined transmission time.

According to an example embodiment a method may comprise: receiving data for encoding; determining a transmission time for transmitting a signal; and determining whether to transmit the signal based on the data. The method may further comprise determining not to transmit the signal at the transmission signal based on the data According to an example embodiment a method may comprise: receiving data for transmission; determining a transmission time for transmitting a signal; and determining whether to transmit the signal based on the data. The method may further comprise determining not to transmit the signal at the transmission signal based on the data According to an example embodiment, the methods may comprise determining not to transmit the signal at the determined transmission time, wherein the data may be encoded into absence of the signal at the transmission time.

According to an example embodiment, the methods may further comprise determining the signal based on the data, wherein the data is further encoded into at least one characteristic of the signal.

According to an example embodiment, the methods may further comprise determining whether to transmit the signal based on an identity of the apparatus; and transmitting the signal, wherein the signal comprises a source identifier and wherein the data is further encoded into the source identifier.

According to an example embodiment, the methods may further comprise selecting a beam based on the data; and transmit the signal with the selected beam, wherein the data is further encoded into the selection of the beam.

According to an example embodiment, the methods may further comprise determining a transmission location based on an arrival angle at a receiver; and transmitting the signal in response to determining that the apparatus is at the transmission location, wherein the data is further encoded into the arrival angle.

According to an example embodiment, the methods may further comprise determining at least one of the transmission time, the signal, whether to transmit the signal, the beam, or the transmission location based on a mapping between the data and at least one of the transmission time, the signal, the source identifier, the beam, or the arrival angle.

According to an example embodiment, the mapping may be provided in a code table, and the method may further comprise receiving an update of the code table.

According to an example embodiment, the methods may further comprise transmitting a reference signal at a reference time; and determining the transmission time relative to the reference time.

According to an example embodiment, the data may comprise an indication of an operation to be performed at a receiver device, a sequence of bits, wherein each bit of the sequence indicates a status of a sensor, measurement data received from at least one sensor, or an operation mode for at least one further signal.

According to an example embodiment, the at least one characteristic of the signal may comprise a bit, a group of bits, an amplitude, a power, a phase, or a frequency of the signal.

Figure 11:
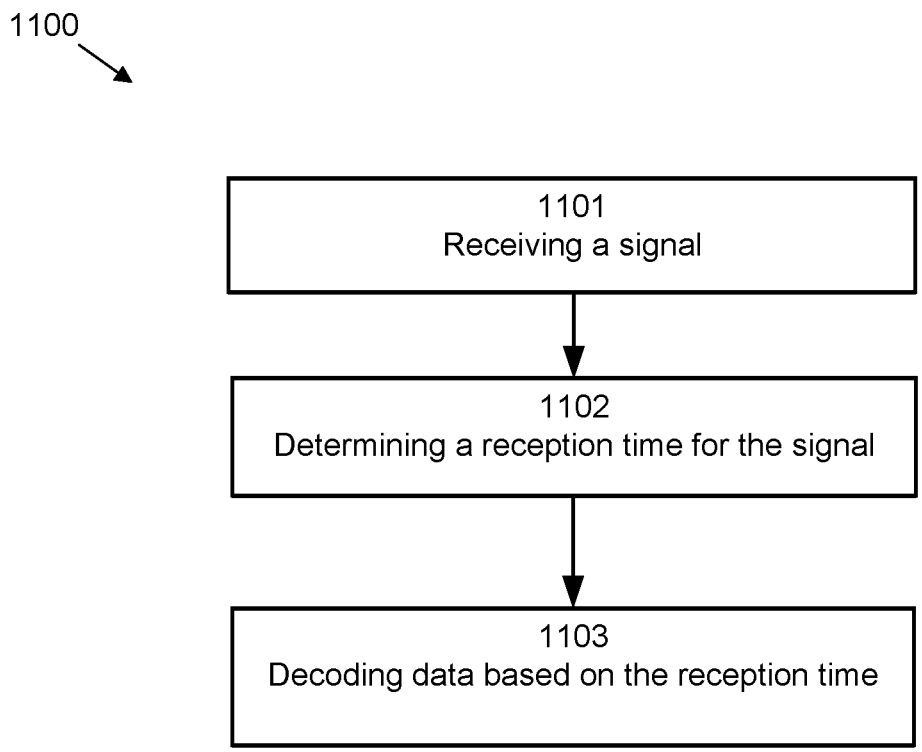
FIG. 11 illustrates an example of a method for decoding a signal, according to an example embodiment.

FIG. 11 illustrates an example of a method 1100 for decoding a bit-time coded signal, according to an example embodiment.

At 1101, the method may comprise receiving a signal.

At 1102, the method may comprise determining a reception time for the signal.

At 1103, the method may comprise decoding data based on the reception time.

According to an example embodiment a method may comprise: determining a reception time for a signal; determining whether the signal was received at the determined reception time; and decoding data based on whether the signal was received at the reception time.

According to an example embodiment, the methods may comprise decoding data based on absence of the signal at an expected reception time.

According to an example embodiment, the methods may further comprise decoding the data based on at least one of: at least one characteristic of the signal, a source identifier included in the signal, a beam associated with reception of the signal, or an angle of arrival associated with the reception of the signal.

According to an example embodiment, the methods may further comprise detecting a source identifier included in the signal and decoding the data based on at least the source identifier.

According to an example embodiment, the methods may further comprise decoding the data based on at least one beam or arrival angle used to receive the signal.

According to an example embodiment, the methods may further comprise decoding the data based on a mapping between the data and at least one of the transmission time, the signal, the source identifier, the beam, or the arrival angle.

According to an example embodiment, the mapping may be provided in a code table, and the method may further comprise receiving an update of the code table.

According to an example embodiment, the methods may further comprise receiving a reference signal; determining a reference time based on reception of the reference signal; and decoding the data based on the reception time relative to the reference time.

According to an example embodiment, the data may comprise an indication of an operation to be performed, a sequence of bits, wherein each bit of the sequence indicates a status of a sensor, measurement data of at least one sensor, or an operation mode for at least one further signal.

According to an example embodiment, the signal may comprise a bit or a group of bits.

According to an example embodiment, one single bit or a group of bits is sent in message payload. If there are more than one device in the network, the receiving part may be configured to recognize, which device sent the bit out at the transmission time. Identification of the device may be sent to receiver. Further there may be security key and/or some other identification information transmitted together with the single bit or group of bits. Furthermore, keeping the electronics alive in the way, that device time would be synchronized to the receiving part clock, would consume more energy from the battery, than the difference between message length sending would cause. For radio resource saving, the payload may be shortest possible message. It is also possible that several IoT devices signal same meaning (their code table vs. signaling time are equivalent) at substantially same time or one or more IoT devices have individual transmission time(s) for the same meaning. This achieves transmission diversity and signaling is therefore more reliably delivered to the receiver.

Reception time may deviate compared to transmission time for example due to delay in transmission path, due to non-ideal synchronization of clocks at different devices, and due to delay at electronics where signal is handled, but interpretation errors may be avoided by keeping transmission time granularity at reasonable level. It is to be noted that there is acceptable deviation between transmission and reception time when interpreting signaling. Delay may for example vary from close to zero to twenty milliseconds, depending on used electronics and connections, for example. The delay will not influence the results and that can be included in code tables, however, longer delay may be possible if agreed.

Further features of the methods directly result from the functionalities and parameters of the transmitter 110 such as for example an IoT device 210, or receiver 120 such as for example an eNB 220, as described in the appended claims and throughout the specification, and are therefore not repeated here. Different variations of the methods may be also applied, as described in connection with the various example embodiments.

An apparatus, for example transmitter 110 or receiver 120 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s). According to an example embodiment a system comprises a first apparatus configured to perform method 1000 and a second apparatus configured to perform method 1100. According to an example embodiment, a system may comprise transmitter 110 and receiver 120.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or substantially simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising at least one processor and at least one memory including computer program code, the at least one memory and the computer code configured to, with the at least one processor, cause the apparatus at least to:
   determine a transmission time for a signal, wherein a data is encoded into the transmission time so that the transmission time corresponds to the data; and
   transmit the signal at the determined transmission time, or determine not to transmit the signal at the determined transmission time.

2. The apparatus of claim 1 further caused to:
   determine the signal based on the data, wherein the data is further encoded into at least one characteristic of the signal.

3. The apparatus of claim 1 further caused to:
   determine the signal based on an identity of the apparatus or a source identifier; and
   transmit the signal, wherein the signal comprises the identity of the apparatus or the source identifier and wherein the data is further encoded into the identity of apparatus or the source identifier.

4. The apparatus of claim 1 further caused to:
   select a beam based on the data; and
   transmit the signal with the selected beam, wherein the data is further encoded into the selected beam.

5. The apparatus of claim 1 further caused to:
   determine at least one of a transmission location, a transmission position, a transmission height, a location for a desired arrival angle at a receiver, a vertical direction for the desired arrival angle at the receiver, or a horizontal direction for the desired arrival angle at the receiver; and
   transmit the signal in response to the determining that the apparatus is at at least one of the transmission location, the transmission position, the transmission height, the location for desired arrival angle at the receiver, the vertical direction for the desired arrival angle at the receiver, or the horizontal direction for the desired arrival angle at the receiver,
   wherein the data is further encoded into the at least one of the transmission location, the transmission position, the transmission height, the location for the desired arrival angle at the receiver, the vertical direction for the desired arrival angle at the receiver, or the horizontal direction for the desired arrival angle at the receiver.

6. The apparatus of claim 1 further caused to:
   determine at least one of the transmission time, the signal, whether to transmit the signal, a beam, or a transmission location based on a mapping between the data and at least one of the transmission time, the signal, a source identifier, the beam, or an arrival angle.

7. The apparatus of claim 6, wherein the mapping is provided in a code table, and wherein the apparatus is further caused to:

receive an update of the code table.

8. The apparatus of claim 1 further caused to:

transmit a reference signal at a reference time; and determine the transmission time relative to the reference time.

9. The apparatus of claim 1, wherein the data comprises one of:

an indication of an operation to be performed at a receiver device, a sequence of bits, wherein each bit of a sequence indicates a status of a sensor, measurement data received from at least one sensor, an operation mode for at least one further signal, a variable, a magnitude, a physical quantity, a quality, a state, a property, a kidney, a grade, a brand, a texture, a rate, an audio signal, a video signal, a threshold, a prediction, a geographical coordination, or a unique data content.

10. The apparatus of claim 1, wherein at least one characteristic of the signal comprises a bit, a group of bits, an amplitude, a power, a phase, or a frequency of the signal.

11. The apparatus of claim 1, wherein the determined transmission time indicates a quantity.

12. The apparatus of claim 1, wherein the data comprises an identified object which is encoded to the transmission time.

13. The apparatus of claim 1, wherein the transmission time indicates the determined transmission time responsive to a positioning data.

14. The apparatus of claim 1, wherein the transmission time is determined within a transmission period.

15. An apparatus, comprising at least one processor and at least one memory including computer program code, the at least one memory and the computer code configured to, with the at least one processor, cause the apparatus at least to:

receive a signal;

determine for the signal at least one of a reception time, a transmission time, or a time window covering the transmission time and the reception time; and decode the data based on at least one of the reception time, the transmission time, or the time window covering the transmission time and the reception time, wherein the data corresponds to at least one of the reception time, the transmission time, or the time window covering the transmission time and the reception time.

16. A system comprising:

a transmitter configured to receive data for encoding;

at least one processor configured to determine a transmission time for a signal, wherein data is encoded into the transmission time so that the transmission time corresponds to the data, wherein the transmitter is configured to transmit the signal at the determined transmission time, or determine not to transmit the signal at the determined transmission time; and a receiver also configured to receive the signal, wherein the at least one processor is also configured to determine for the signal at least one of a reception time, the transmission time, or a time window covering the transmission time and the reception time; and to decode the data based on at least one of the reception time, the transmission time or the time window covering the transmission time and the reception time, and wherein the data corresponds to at least one of the reception time, the transmission time, or the time window covering the transmission time and the reception time.

17. The system of claim 16, wherein the at least one processor is further configured to: determine at least one of: a transmission location, a transmission position, a transmission height, a location for desired arrival angle at the receiver, a vertical direction for a desired arrival angle at the receiver, or a horizontal direction for a desired arrival angle at the receiver; and cause the signal to be transmitted in response to the determining that the transmitter is placed at at least one of: the transmission location, the transmission position, the transmission height, the location for the desired arrival angle at the receiver, the vertical direction for the desired arrival angle at the receiver, or the horizontal direction for the desired arrival angle at the receiver, wherein the data is further encoded into the at least one of: the transmission location, the transmission position, the transmission height, the location for the desired arrival angle at the receiver, the vertical direction for the desired arrival angle at the receiver, or the horizontal direction for the desired arrival angle at the receiver.

18. The system of claim 16, wherein the transmitter comprises a coding table for encoding and the receiver comprises a corresponding coding table for decoding.

19. The system of claim 16, wherein based on that the signal has been transmitted at a particular time, the at least one processor is further configured to determine by the receiver a quantity.

20. The system of claim 16, further comprising: one or more devices which are configured to communicate with signals having a same meaning at substantially a same time, or the one or more devices have individual transmission time(s) that have the same meaning.

* * * * *